US008882083B2

(12) United States Patent
Ramskov (10) Patent No.: US 8,882,083 B2
(45) Date of Patent: Nov. 11, 2014

(54) GUARDRAIL

(75) Inventor: Lasse Fomsgaard Ramskov, Vanlose (DK)

(73) Assignee: Lasse Ramskov Holding ApS, Hvidovre (DK)

( * ) Notice: Subject to any disclaimer, the term of this patent is extended or adjusted under 35 U.S.C. 154(b) by 0 days.

(21) Appl. No.: 14/110,113

(22) PCT Filed: Apr. 10, 2012

(86) PCT No.: PCT/DK2012/050119
§ 371 (c)(1),
(2), (4) Date: Oct. 4, 2013

(87) PCT Pub. No.: WO2012/136227
PCT Pub. Date: Oct. 11, 2012

(65) Prior Publication Data
US 2014/0021424 A1    Jan. 23, 2014

(30) Foreign Application Priority Data
Apr. 8, 2011    (DK) .................................. 2011 00277

(51) Int. Cl.
*E04H 1/00* (2006.01)
*F16B 7/18* (2006.01)
*E04G 21/32* (2006.01)
*E04B 1/58* (2006.01)

(52) U.S. Cl.
CPC ............ *E04G 21/3204* (2013.01); *F16B 7/187* (2013.01); *E04B 2001/5881* (2013.01); *E04G 21/3223* (2013.01); *F16B 7/182* (2013.01); *E04B 1/5831* (2013.01)
USPC ......................... 256/65.01; 403/257; 52/238.1

(58) Field of Classification Search
USPC ........... 256/24, 68, 69, DIG. 6; 403/253, 254, 403/257–261; 52/238.1; 182/112, 113
See application file for complete search history.

(56) References Cited

U.S. PATENT DOCUMENTS 3,839,834 A * 10/1974 Goddard ...................... 52/238.1
4,787,475 A    11/1988 Arteau et al.
(Continued)

FOREIGN PATENT DOCUMENTS

CA     2549335 A1    1/2006
DE     2515945 A1    10/1976
(Continued)

OTHER PUBLICATIONS

International Search Report and Written Opinion, PCT/DK2013/050119, mailed Feb. 6, 2013.

*Primary Examiner* — Joshua Kennedy
(74) *Attorney, Agent, or Firm* — Winston & Strawn LLP (57) ABSTRACT

A guardrail for protecting persons against accidentally falling out of open floors. The guardrail has a number of constructional elements and connectors for assembling a coherent guardrail. The connectors include at least one first connector which has a longitudinal shape and is formed with at least one longitudinal extending slot, and at least one second connector having a first connector part to be connected to the at least one constructional element and a second connector part to connect the first connector part to the at least one first connector while engaging the at least one longitudinal extending slot of that connector. The guardrail has a stable, inexpensive and simple structure which quickly and easily can be assembled to a coherent guardrail and be disassembled. The guardrail can be fitted too to the width and height required of the guardrail for a specific opening of a given open floor.

20 Claims, 8 Drawing Sheets

(56) References Cited

U.S. PATENT DOCUMENTS

| | | | |
|---|---|---|---|
| 5,430,984 A * | 7/1995 | Young et al. | 52/281 |
| 5,474,279 A * | 12/1995 | Parisien | 256/24 |
| 6,151,856 A | 11/2000 | Shimonohara | |
| 6,729,083 B1 * | 5/2004 | Soyko | 52/220.8 |
| 6,751,914 B2 * | 6/2004 | Zeh et al. | 52/239 |
| 7,389,621 B2 * | 6/2008 | Hawes | 52/655.1 |
| 7,624,548 B2 * | 12/2009 | Hansen et al. | 52/202 |
| 8,393,122 B2 * | 3/2013 | Henriott et al. | 52/239 |
| 8,585,000 B2 * | 11/2013 | McPheeters | 248/228.2 |
| 2006/0180702 A1 | 8/2006 | Pfeifer | |
| 2007/0145340 A1 | 6/2007 | Brabeck et al. | |

FOREIGN PATENT DOCUMENTS

| | | |
|---|---|---|
| DE | 3303070 A1 | 8/1984 |
| DE | 3303190 A1 | 8/1984 |
| EP | 0821122 A1 | 1/1998 |
| FR | 1328769 | 7/1962 |
| FR | 2281471 | 3/1976 |
| GB | 2035409 A | 6/1980 |
| GB | 2447784 A | 9/2008 |
| WO | WO2004085862 A1 | 10/2004 |
| WO | WO2005031087 A1 | 4/2005 |

* cited by examiner

GUARDRAIL

CROSS-REFERENCE TO RELATED APPLICATIONS

This application is a 371 filing of International Patent Application PCT/DK2012/050119 filed Apr. 10, 2012 (as Apr. 8, 2012 was a Saturday), which claims the priority of Danish patent application no. PA 2011 00277 filed Apr. 8, 2011.

BACKGROUND

The invention relates to a guardrail for protecting persons being present on open floors of buildings or scaffolds against accidentally falling out of the opening of such floors. The guardrail comprises a number of constructional elements and connectors for assembling said constructional elements to a coherent guardrail.

The invention also relates to a method for assembling said guardrail.

The term constructional element is within the context of the present invention a device which has a relatively large extent in two dimensions and a relatively little thickness in the third dimension and which is preferably without any opening or at least without any openings large enough for allowing a person to pass through.

During erecting of some multi-story building are the outer walls around a floor often not yet built. A similar situation exists during erection of scaffolds.

Persons such as workers being present on such open floors need to be safely protected against accidentally falling out of the openings of the floors so that they do not risk to be seriously injured when hitting e.g. the ground below.

Many attempts have during the years been made to solve this important problem with the result that various kinds of guardrails to be attached to or close to the edge of the respective floors have been developed.

Such guardrails consist normally of a number of vertical posts, which each is releasable attached to an open floor at an edge of this, and of a number of horizontal rails, which each is releasable attached to the posts.

U.S. Pat. No. 4,787,475 discloses a guardrail of this kind. A disadvantage of this known guardrail is however that a number of openings are left between the posts and the rails. Said openings are unfortunately large enough to allow a person accidentally to falling out of the openings.

Also tools and other objects could accidentally fall out of said openings and hit persons below whereby those persons could be seriously injured since such tools and objects often are relatively heavy.

Another disadvantage of said known guardrail consists in the fact that the posts and rails of this are relatively long and therefore troublesome and dangerous to handle within an often narrow space close to the edge of the open floor.

Since such open floors often are relatively inaccessible and placed at a relatively high level the long posts and rails are moreover difficult to transport up to such floors and down again to the ground.

The posts and rails of this known guardrail are furthermore assembled by means of connections such as hinges, which make the guardrail unstable and easy to destroy.

It is furthermore difficult to connect the cross-joints between the posts and rails of the known guardrail because it during the assembling of the guardrail is necessary to manually hold the long rails in the required horizontal position.

Owing to the lots of such connections to be carried out for assembling the post and rails to a finished guardrail extending along the edges of an open floor is the assembling of the guardrail also very time consuming.

Such guardrails are normally used only within a limited period of time after which the guardrails need to be dismantled again and removed from the floor whereby the above-mentioned problems appear again but in the inversed order.

SUMMARY OF THE INVENTION

The drawbacks and disadvantages of the above-mentioned guardrail for protecting persons being present on open floors of buildings or scaffolds against accidentally falling out of the opening of such floors with the risk of seriously being injured and/or injuring other people are according to the invention remedied by, in a first aspect, according to the invention, providing a guardrail of the kind mentioned in the opening paragraph, which is arranged for effectively being able to protect persons and objects being present on an open floor of e.g. a building or a scaffold to fall out of said opening, in a second aspect, according to the invention, providing a guardrail of the kind mentioned in the opening paragraph, which has a stable structure, in a third aspect, according to the invention, providing a guardrail of the kind, mentioned in the opening paragraph, which is assembled of guardrail elements in such a way that the elements cannot accidentally be taken apart, in a fourth aspect, according to the invention, providing a guardrail of the kind mentioned in the opening paragraph, which has a cheap and simple structure, in a fifth aspect, according to the invention, providing a guardrail of the kind mentioned in the opening paragraph, which quickly and easily can be assembled and disassembled again, in a sixth aspect, according to the invention, providing a guardrail of the kind mentioned in the opening paragraph, which is composed of elements which are adapted to easily being brought forwards and backwards between e.g. a stock of elements and the open floor where the elements are intended to be assembled and disassembled again, and in a seventh aspect, according to the invention, providing a guardrail of the kind mentioned in the opening paragraph, which is composed of elements which can be assembled to a guardrail fitting to the width and height required for a specific opening of a given open floor.

The novel and unique features according to the invention whereby this is achieved consists in the fact that the connectors comprise at least one first connector, which has a longitudinal shape and is formed with at least one longitudinal extending slot and at least one second connector consisting of a first connector part to be connected to the constructional element and a second connector part to connect the first connector part to the first connector while engaging the slot of this.

This guardrail offer persons present upon an open floor a more secure protection against falling out of the openings of such open floors than hitherto known.

This important advantage is obtained by the fact that the flat constructional elements of the guardrail effectively exclude any presence of openings in the finished guardrail large enough to allow a person to pass.

The guardrail has moreover a simple and cheep construction, which quickly and easily can be assembled to a coherent structure and afterwards be dismantled again.

The particular construction of the guardrail implies, according to the invention, that the first connectors each can be formed with a relatively short length so that the first connectors easily and without any risk can be transported up to an open floor and down again.

Such relatively short length of the first connectors makes it, according to the invention, moreover safe to assemble the guardrail on an even narrow place close to the edge of an open floor.

In an expedient embodiment of the invention the slots of the first connectors each can be a T-slot and the first connector part of the second connector be a fitting, which is adapted to be connected to the constructional element while the second connector part of the second connector can be a screw joint for screwing the fitting to the first connector with the nut or head of the screw of the screw joint placed in said T-slot whereby a strong and durable connection between the first connector and the constructional element quickly and easily can be established.

The T-slot can be replaced with e.g. a dovetail slot or a slot with any other kind of shape, where the opening of the slot is more narrow than the bottom of the slot, thereby ensuring that the second connector can be secured to the first connector without piercing the first connector.

According to the invention the guardrail can quickly and easily be assembled to a strong and stable structure, which fits to be placed at the edge of an open floor, when the constructional element is formed with a flange and the first connector part, such as the fitting mentioned above, is formed with a hook adapted for catching said flange.

The guardrail can likewise quickly and easily be disassembled again in the opposite order after having served for effectively protecting persons on the open floor against accidentally falling out of the openings of the floor. Such accident is especially very dangerous when the floor is placed at a high level.

A simple structure of the assembled guardrail is obtained when the constructional elements each has a quadratic or rectangular shape with four edges.

That shape is imparting the guardrail also with a highly conspicuous appearance, which clearly indicates the position of the edges of an open floor. Persons present on such open floors are thereby able to adapt themselves to this important knowledge so that they can watch their steps.

Each of the constructional elements of the guardrail can, according to the invention, simply be formed as a plate or alternatively as a net extending between a peripheral frame.

In a preferred embodiment according to the invention can each of the constructional elements moreover be formed as the closure known from the inventor's patent publication no. WO 2005/031087 A, which patent application is included in the present patent application by reference.

Said known closure serves for temporary closing an opening in a building being built, rebuilt or renovated and consists in the main of a rectangular frame with a changeable size and a pane, which can be mounted in the frame in any size of this.

By means of this known constructional element is the guardrail of the invention advantageously able to adapt its size to the size of the opening of a given open floor.

The height of the frame can according to the invention moreover be changed in such way that the guardrail extends all the way between two succeeding open floors whereby is achieved that the guardrail forms a wall enclosing the room behind the wall so that the room during the cold periods of the year advantageously can be heated to a temperature comfortable for staying in the room.

In a preferred embodiment of the invention each of the first connectors can be a tube section, which advantageously can be used as posts in the finished guardrail.

When a relatively short tube section is not long enough for serving as a post in a specific guardrail can a post that is long enough, according to the invention, be made of two or more tube sections placed in continuation of each other.

A guardrail placed on an open floor and thereby its posts, which are that part of the guardrail, which is attached to the open floor, can be influenced by transverse forces from e.g. the wind and/or from persons accidentally hitting the guardrail with their body whereby bending stresses would arise in the posts.

For being able to resist such bending stresses two consecutive placed first connectors, such as the tube sections mentioned above, can according to the invention be connected to each other by means of a third connector consisting of a bar, which covers the mouth of the slot, such as the T-slot or dovetail slot of the tube section, along a length of both first connectors and is screwed onto the first connectors by means of screws having their head or nut placed in the slots of both first connectors.

The above-mentioned third connector between two consecutive placed tube sections is, according to the invention, advantageously securing the relatively long post of two or more relatively short tube sections against being bent too much in the interface between the tube sections and especially effectively if two opposite sides of the tube sections are secured in that way.

By not aligning the horizontal edges of the constructional elements with the interface between two consecutive placed tube sections is furthermore obtained the advantage that the strength against being bent in the interface between two consecutive placed tube sections is increased by the strength against being bent of the associated constructional element itself.

A guardrail and thereby the posts of the guardrail can be influenced by upwards directed forces too whereby tensile stresses would arise in the posts.

For being able to resist such tensile stresses two consecutive placed first connectors, e.g. the tube sections mentioned above, can according to the invention be connected to each other by means of a fourth connector, e.g. a rod, where the rod is extending at least along a part of a guide formed in the interior of both of the two consecutive placed first connectors whereby the fourth connector can be anchored to both of two consecutive placed first connectors by means of pins, e.g. shanks of screws extending through flushing openings in the fourth connector and the wall of the guide.

In an expedient embodiment of the fourth connector, such as the rod, for connecting two consecutive placed first connectors, such as tube sections, the fourth connector can be a length of a tube, which has the required moment of inertia without using too much material.

According to the invention the guardrail can be assembled by connecting consecutive placed first connectors, such as tube sections, to each other and connecting the constructional elements to said interconnected first connectors.

BRIEF DESCRIPTION OF THE DRAWINGS

The invention will be explained in greater details below, giving further advantageous features and technical effects and describing exemplary embodiments with reference to the drawing, in which.

DETAILED DESCRIPTION OF THE INVENTION

The guardrail seen in the figures serves for preventing persons being present on open floors of buildings or scaffolds against getting hurt by falling out of the opening of such floors.

Figure 3:
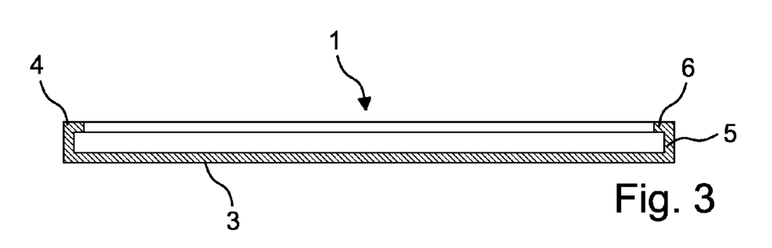
FIG. 3 is a lateral view of a constructional element according to the invention.
Figure 4:
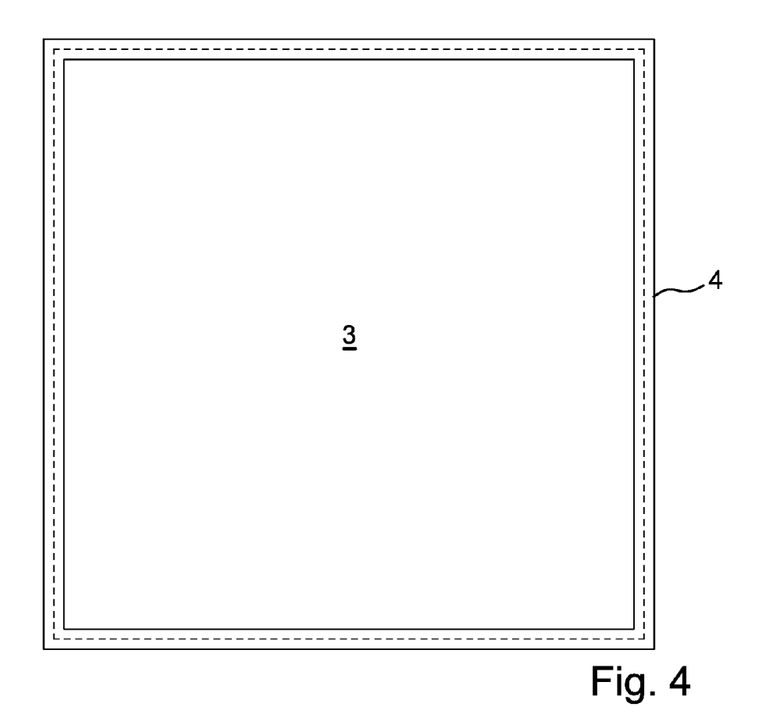
FIG. 4 is a cross section of the same.

The constructional element 1 is in this case (shown in FIGS. 3 and 4) formed as a quadratic or rectangular plate 3 with a flange 4 extending along the periphery of the plate, whereby the flange is formed with a first flap 5, perpendicular to the plate and a second flap 6, perpendicular to the first flap.

The element may e.g. be integrally made of e.g. metal or plastic or be a plate of e.g. metal, plastic or wood with a separate flange attached to the edge of the plate.

Within the scope of the invention the element can also be formed as a net fastened to a peripheral frame, (not seen).

Figure 1:
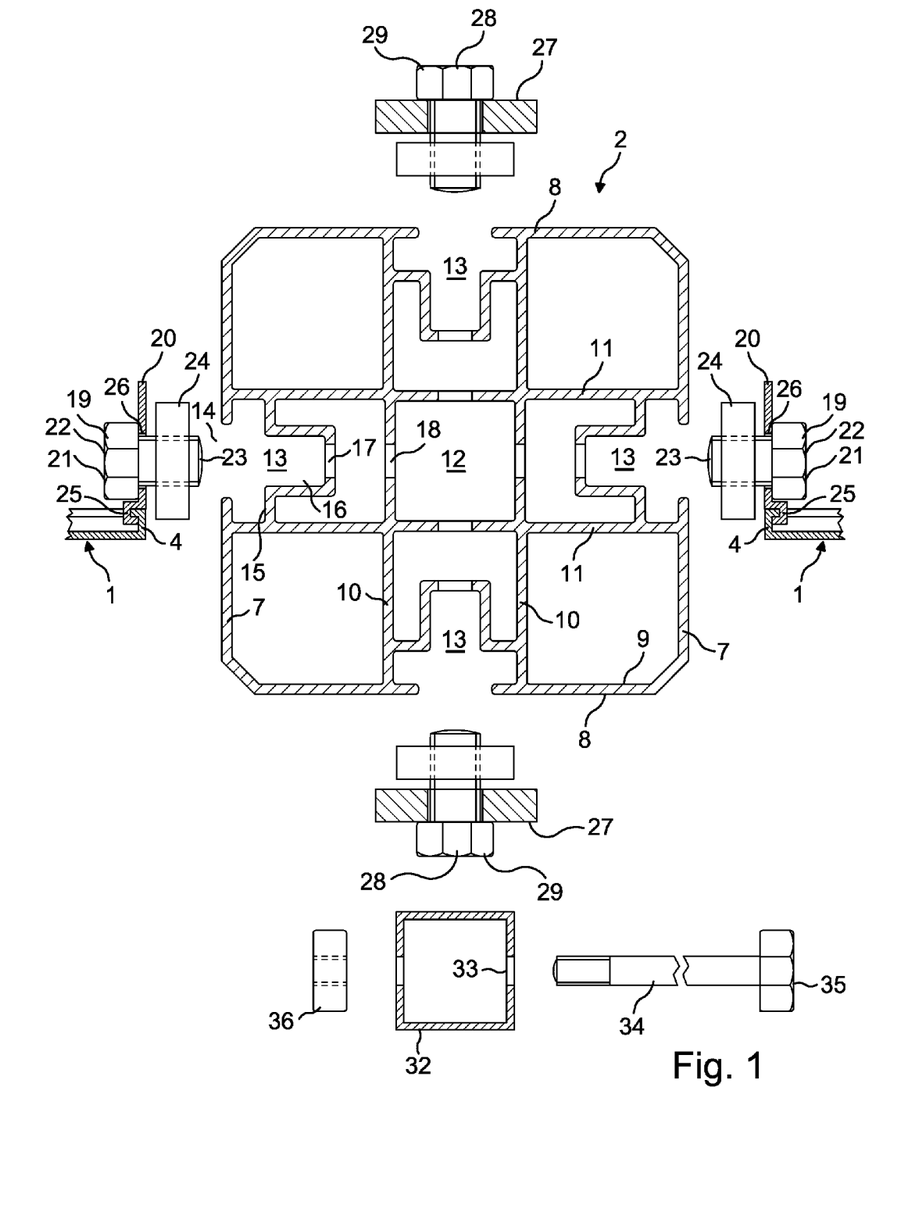
FIG. 1 is an exploded view, seen in cross section, of a segment of the guardrail according to the invention.
Figure 2:
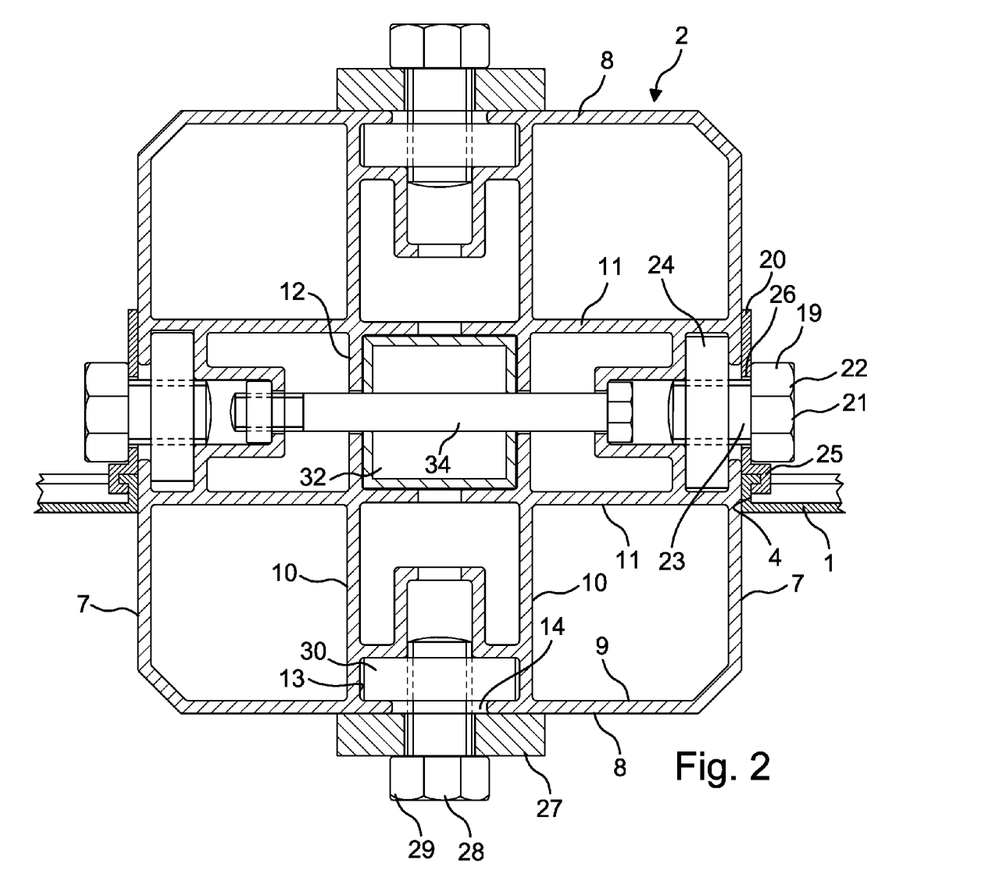
FIG. 2 shows the same, but in assembled state.

The tube section 2 shown in FIGS. 1 and 2 has in this case a mainly quadratic cross section with pairs of opposite sides 7 and 8.

Within the scope of the invention may the cross section of the tube section have other shapes, (not shown in FIGS. 1 and 2).

The tube section 2 has an outer wall 9 and two pairs of inner walls 10 and 11, which are extending between each their pair of opposite sides 7 and 8 and are intersecting each other so that a central inner tube 12 is formed in the tube section.

The outer wall 9 of the tube section 2 is at each side 7 and 8 formed with a longitudinally extending T-slot 13 with an opening 14 in the outer wall of the tube section and a bottom 15 which extends between each pair of the inner walls 10 and 11 of the tube section 2 and is formed with a longitudinally extending recess 16.

Flushing holes 17 and 18 are moreover formed in the bottom of the longitudinally extending recess 16 of the T-slot 13 and in the pair of inner walls of the central inner tube 12.

Figure 7:
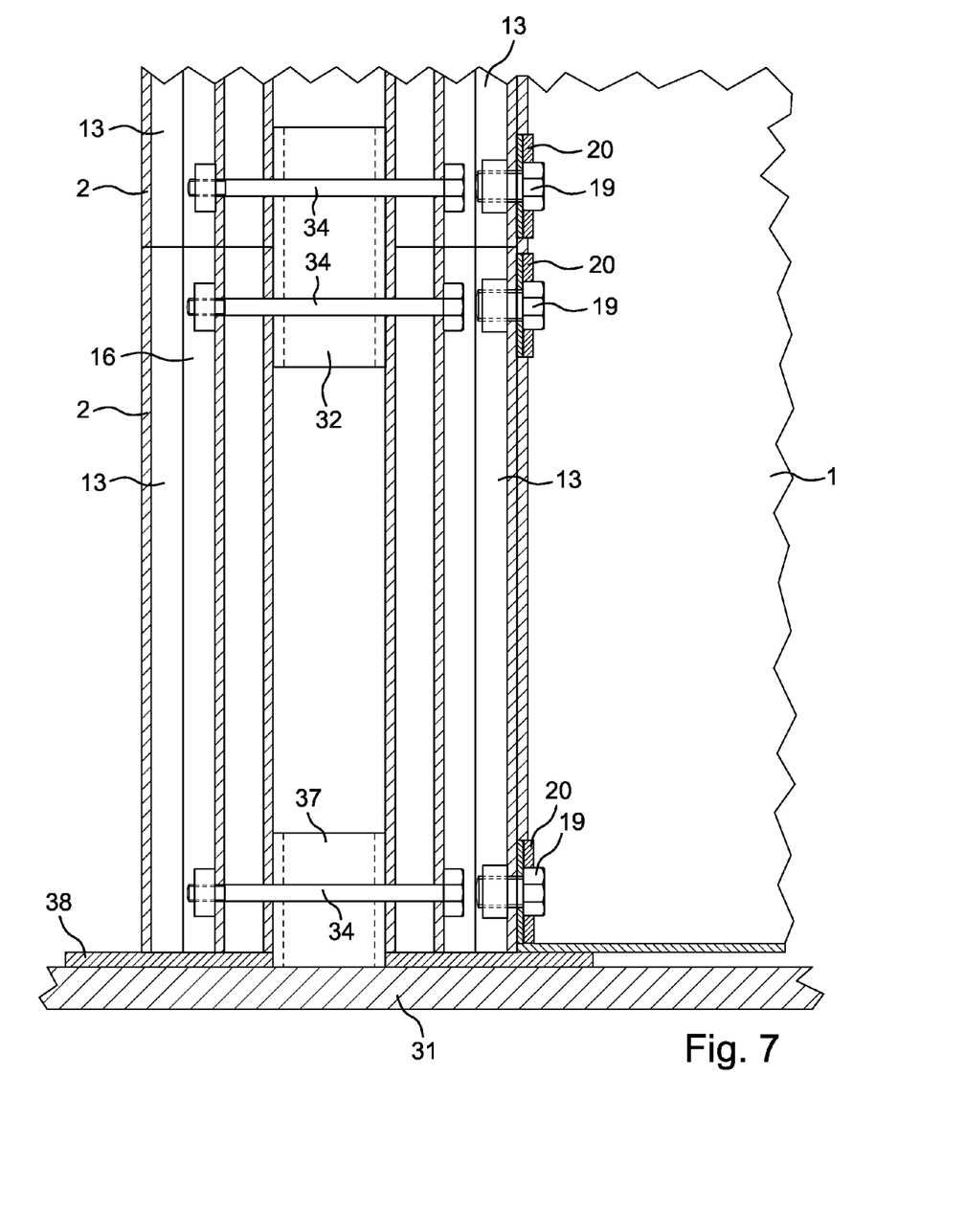
FIG. 7 is a longitudinal section of another embodiment of a segment of the guardrail according to the invention.
Figure 8:
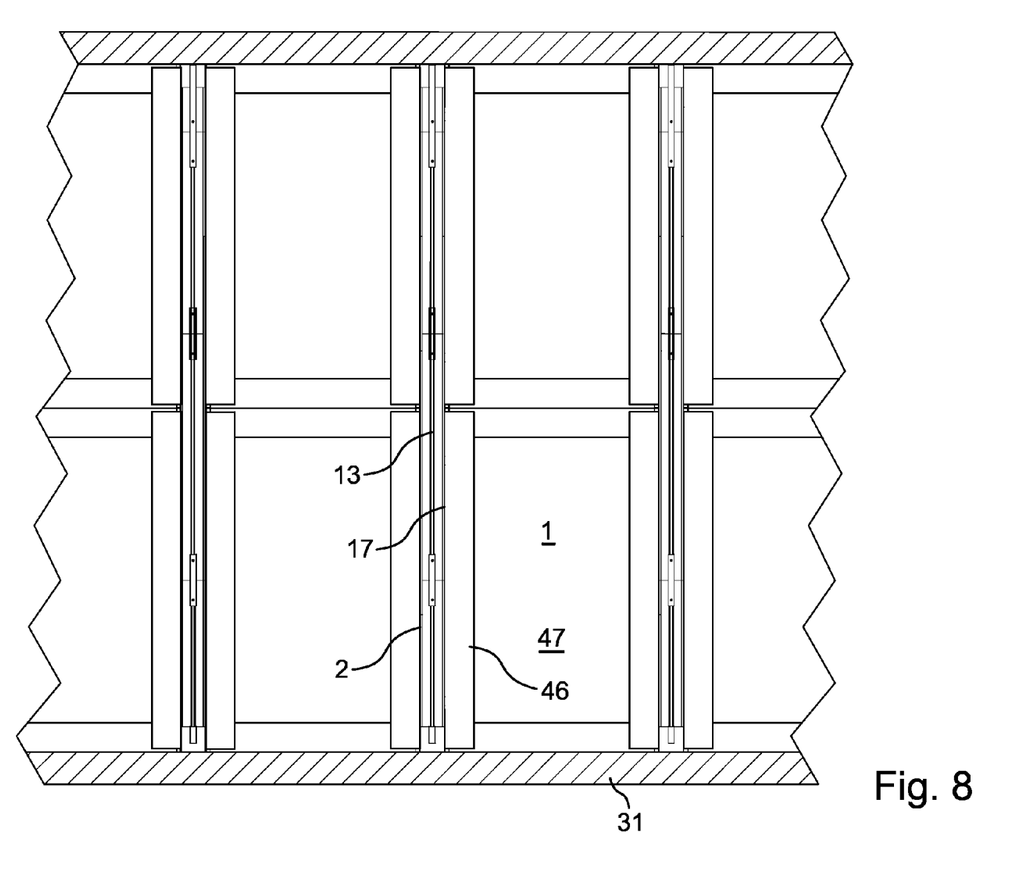
FIG. 8 is a lateral view of a fragment of an assembled guardrail according to the invention.

The tube sections 2 serve as posts 2 in the assembled guardrail seen in FIG. 8 whereby a constructional element 1, as seen in FIG. 2 and in FIG. 7 in fragment, are connected with a post 2 by means of in this case a screw joint 19 and a fitting 20 whereby the screw joint 19 consists of a screw 21 with a head 22, a shank 23 and a nut 24 and the fitting 20 is formed with a hook 25 and a through hole 26.

The connection between the constructional element 1 and the post 2 takes quickly and easily place by placing either the nut 24 or head 22 of the screw 21 of the screw joint 19 in the T-slot 13 of the tube section 2, connecting the flange 4 of the constructional element 1 to the hook 25 of the fitting 20, pushing the shank 23 of the screw 21 through the hole 26 in the fitting 20 and tighten the screw joint 19.

The performed connection between the constructional element 1 and the tube section 2 complies effectively with the demands required of a guardrail mounted upon an open floor.

The connection is moreover releasable so that a guardrail on an open floor quickly and easily can be dismantled and removed from the floor after having been used.

As previously mentioned the tube sections 2 can each have a relatively short length whereby is obtained the advantage that said tube sections easily and without any risk can be transported up to an open floor and down again.

Another advantage obtained by using such relatively short tube sections consist in the fact that they are easy and safe to handle at an even narrow place close to an edge of an open floor, (not seen) of a building, (not seen) or a scaffolding, (not seen).

When a relatively short tube section is not long enough for serving as a post in a specific guardrail can a post that is long enough be made of two or more tube sections placed in continuation of each other as seen in FIGS. 5 to 8.

The posts 2 of the guardrail are as seen in FIG. 8 attached to an open floor 31 where the guardrail easily can be influenced by crossway acting forces from wind and/or from persons accidentally hitting the guardrail with their body. Said forces are transmitted to the posts 2 whereby heavy bending stresses can arise in the posts.

Each post of the guardrail consists in FIG. 8 of two consecutive placed tube sections, which however not themselves are able to resist the above-mentioned heavy bending stresses in the interface between the two tube sections.

Figure 5:
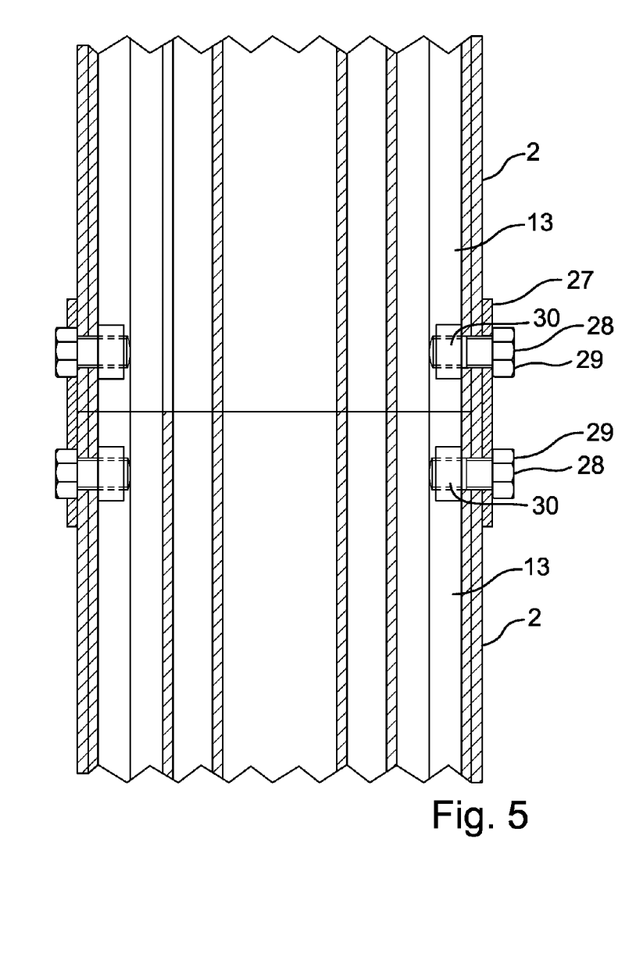
FIG. 5 is a longitudinal section of an embodiment of a segment of the guardrail according to the invention.
Figure 6:
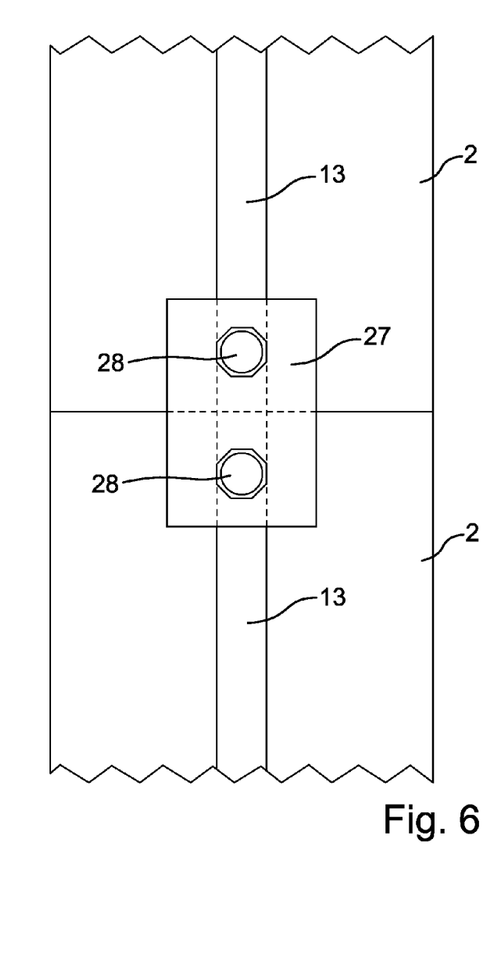
FIG. 6 shows the same, but seen from the front.

That serious problem is remedied by means of the connection between the two tube sections shown in 5 and 6, where FIG. 5 shows a longitudinal section of the two tube sections 2 placed in continuation of each other and FIG. 6 shows the same, but seen from the front. Said connection is shown also in cross section in FIG. 2.

The two tube sections 2 are connected to each other at their opposite sides 8-8 by means of lengths of a bars 27, which cover the openings 14 of the T-slots 13 along a length of both tube sections and is screwed onto the T-slots of both tube sections by means of screws 28 having their head 29 or nut 30 placed in the T-slots of both tube sections as seen also in the cross section shown in FIG. 2.

This connection between the two tube sections of the post of the guardrail is in a simple and effective way advantageously imparting the two tube sections the necessary strength against being bent in the interface between the two tube sections.

The guardrail shown in FIG. 8 can be influenced also by upwards acting forces when being in position on the open floor 31. These forces are transmitted to the posts, since the posts are those parts of the guardrail, which are attached to the floor. In FIG. 8 consist each post of two consecutive placed tube sections 2.

In preparation for preventing that said upwards acting forces are pulling the two tube sections of each post from each other is a length of, in this case a tube 32 as seen in FIGS. 2 and 7, placed in the inner tube 12 in the tube section 2 with a part in each of the inner tubes of the two tube sections.

Figure 9:
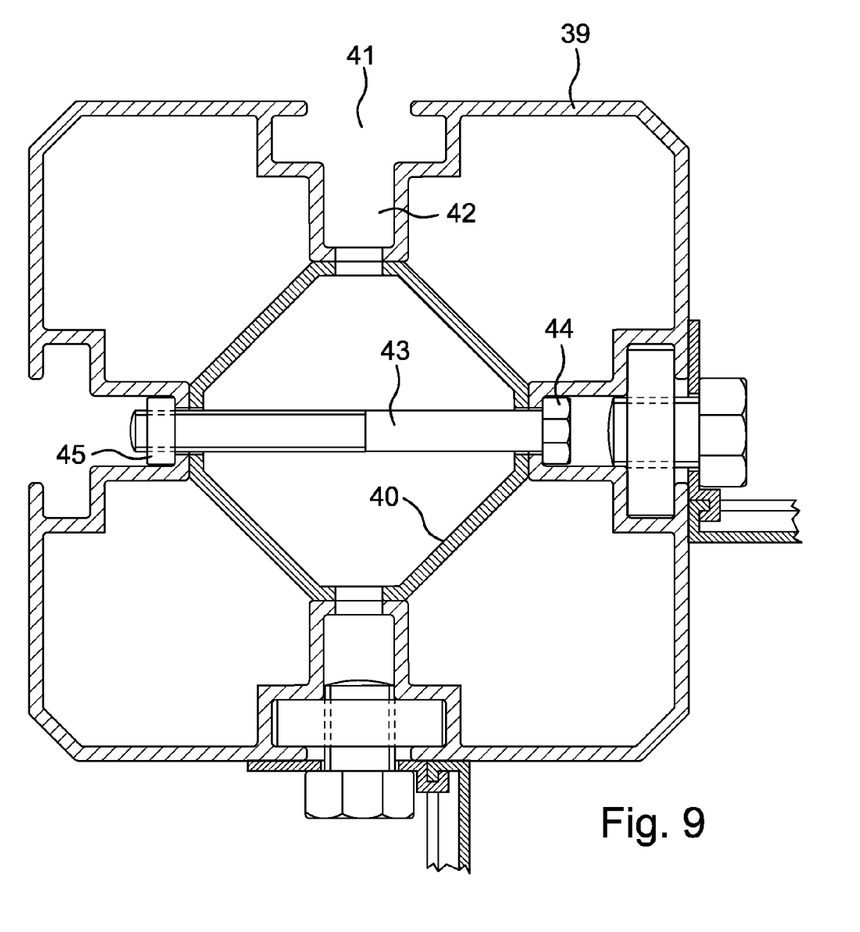
FIG. 9 shows a part of a cross section of a second embodiment of a segment of the guardrail according to the invention.

The inner tube 12 and the length of tube 32 are in this case formed with quadratic cross sections, as seen in FIGS. 1 and 2. Within the scope of the invention the cross section of e.g. the inner tube 12 can have other shapes, for example an octagonal shape as seen in FIG. 9.

The length of tube 32 is formed with holes 33 flushing with both the holes 17 in the bottom of the longitudinally extending recess 16 of the T-slot 13 of the tube sections 2 and the holes in the inner walls 10-10 of the tube section 2 and is anchored in both sections 2 by means of screw bolts 34 pushed through the holes 17, 18, 33 with their head 35 and nut 36 placed in the longitudinally extending recess 16 of two opposite placed T-slots of the tube section 2.

FIG. 7 shows a length of a tube 37, which is formed with the same cross section as the length of tube 32 but in this case with a shorter length.

The length of tube 37 is mounted in the inner tube 12 in the tube section 2 in the same way as the length of tube 32 but at the bottom of the tube section 2 and it serves for connecting the tube section 2 with a base plate 38 for attaching the tube section 2 to the open floor 31.

FIG. 7 also shows a constructional element 1, seen in fragment, which is attached to the tube section 2 in the same way as discussed above with reference to FIG. 2.

It is noted that the interface between the two tube sections 2 is not flushing with the interface between two consecutive placed constructional elements 1 whereby the constructional elements themselves advantageously are increasing the bending moment of the interface between the two tube sections, which form the posts of the guardrail of the invention.

FIG. 9 is a cross section of another embodiment of a tube section 39 of the invention and of another embodiment of a length of tube 40 for interconnecting two consecutive placed tube sections, which in assembled state constitute a post of the guardrail of the invention.

The lengths of tube 40 have in this case an octagonal shape, seen in section but can for example also have a quadric shape, (not shown).

The tube section 39 is formed with four T-slots 41, which have the same shape as the T-slots 13 shown in FIGS. 1 and 2. The tube section 39 differs however from the tube section 2 in that it is without pairs of inner walls.

The tube 40 is anchored in the length direction in the tube section 39 by means of screw bolts 43, which have their head 44 and nut 45, placed in the recesses 42 of opposite T-slots 41.

In the previously mentioned FIG. 8, which shows a fragment of a guardrail, are the constructional elements of that kind, which are known from the inventor's patent publication no. WO 2005/031087 A, but here only schematically shown.

Said known constructional elements comprises each a frame 46 adapted to change its height and width in accordance with the desired height and length of a given guardrail of which the element constitutes a part. A panel 47 is releasable mounted in the frame 46 in such way that the frame is allowed to change its height and length.

As seen in FIG. 8 the size of the known elements is in this case adjusted in such way that the guardrail extends all the way between two succeeding open floors whereby the guardrail form a wall enclosing the room behind the wall.

The guardrail of the invention does in this way not only serve for protecting persons against accidentally falling down but serves advantageously also for temporarily keeping out rain, snow and wind and during the cold period of the year for keeping the heat inside the building.

The guardrail in form of the wall serves moreover for preventing unauthorized persons from gaining access to the room behind the wall.

The panel can be made of e.g. wood or glass. In FIG. 8 are such shown two rows of the known constructional elements of which the panel of the uppermost row can be made of glass and the lowermost of wood.

Thereby is obtained a guardrail which both is strong and advantageously also allow the daylight to fall into the room behind the wall.

It is noted that all the panels of the shown guardrail can be made of glass, and that the guardrail also can comprise more rows of constructional elements placed on top of each other.

In FIG. 9 is also seen that the tube section in this case is connected with two constructional elements which form a right angle with each other whereby is achieved the advantage that the guardrail continuously can follow the edge of a quadratic or rectangular open floor.

The above-mentioned embodiment of a post of the guardrail of the invention is cost saving since it is made of lesser material simultaneously with that the moment of inertia of the length of tube 40 is large enough to impart two consecutive placed tube section the necessary strength against being bent in the interface between the two tube sections.

Figure 10:
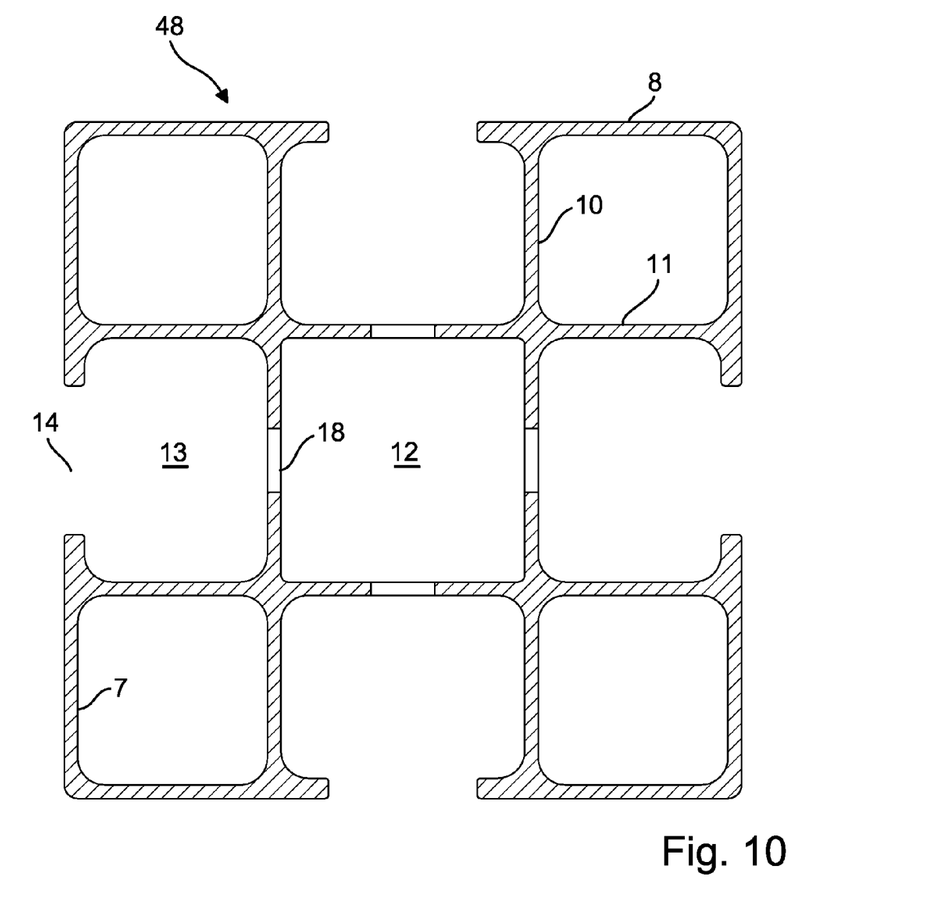
FIG. 10 shows across section view of a third embodiment of the first connector according to the invention.

FIG. 10 shows a third embodiment of a tube section 48 of the invention, which section at least in the main corresponds to the first embodiment 2 of the invention. Same parts therefore are denoted with same numerals. In this third embodiment of the tube section 48 is the bottom 15 and the recess 16 of the longitudinal extending T-slot 13 however left out whereby a simpler and more inexpensive tube section advantageously is achieved.

What is claimed is:

1. A guardrail for protecting persons being present on open floors of buildings or scaffolds against accidentally falling out of the opening of such floors, comprising a number of constructional elements and connectors for assembling the constructional elements to a coherent guardrail, wherein the connectors comprise at least one first connector which has a longitudinal shape and is formed with at least one longitudinal extending slot, and at least one second connector consisting of a first connector part to be connected to the at least one constructional element and a second connector part to connect the first connector part to the at least one first connector while engaging the at least one longitudinal extending slot of the first connector; wherein the at least one constructional element includes a frame adapted to change its height and width in such way that the guardrail extends all the way between two succeeding open floors and a panel releasably mounted in the frame in such way that the frame is allowed to change the height and width and wherein the guardrail is a temporary guardrail.

2. The guardrail according to claim 1, wherein the first connector part of the second connector is a fitting adapted to be connected to the at least one constructional element and that the second connector part is a screw joint for screwing the fitting to the first connector with the nut or head of the screw of the screw joint placed in the at least one longitudinal extending slot of the first connector.

3. The guardrail according to claim 1, wherein the at least one constructional element is formed with a flange and that the first connector part is formed with a hook for catching the flange.

4. The guardrail according to claim 1, wherein the first connector is at least one tube section, and that the at least one slot is a T-slot or dovetail slot formed in the wall of the tube section.

5. The guardrail according to claim 4, wherein the edge of the at least one constructional element is formed as a T or a dovetail, seen in section, and that this edge fits into the T-slot or dovetail slot of an associated tube section.

6. The guardrail according to claim 4, wherein each tube section has four sides and that a T-slot or a dovetail slot is formed in each of the sides.

7. The guardrail according to claim 4, wherein the at least one constructional element has a quadratic or rectangular shape with four edges and that the surface of separation between two consecutive tube sections is not placed at the surface of separation between two consecutive placed constructional elements.

8. A method for assembling a number of constructional elements by means of a number of connectors to form a coherent guardrail according to claim 4, which comprises:
 disposing at least two of the first connectors with their T-slots or dovetail slots placed in continuation of each other,
 connecting the at least two first connectors by inserting a fourth connector in the guide of both of the first connectors,
 anchoring the fourth connector in both of the first connectors by a screw bolt pushed through flushing openings in the bottom of the recess of the T-slot or dovetail slots and in the wall of the guide, respectively,
 connecting the at least two first connectors to each other by attaching a third connector to the T-slot or dovetail slots of both first connectors, and
 connecting at least one constructional element with one or both first connectors by the second connector while simultaneously engaging a longitudinal extending slot of the first connector.

9. The method according to claim 8, wherein the connections between the elements are releasable.

10. The guardrail according to claim 1 which further comprises at least one third connector for connecting two consecutive first connectors placed with their slots in continuation of each other.

11. The guardrail according to claim 10, wherein the third connector is a bar, which covers the mouth of the T-slot along a length of both tube sections and is screwed onto the tube sections by means of screws having their head or nut placed in opposite T-slots in the tube sections.

12. The guardrail according to claim 10, wherein the at least one third connector is a bar fitting into the at least one slot of both of the two consecutive placed tube sections.

13. The guardrail according to claim 10, wherein the guardrail comprises a fourth connector for connecting two consecutive tube sections placed with their T-slots or dovetail slots in continuation of each other.

14. The guardrail according to claim 13, wherein the fourth connector is a rod extending at least along a part of the interior of both of the two consecutive placed tube sections.

15. The guardrail according to claim 14, wherein a guide for the rod is made of a central tube which is connected to the outer wall of the tube section by inner walls in the tube section.

16. The guardrail according to claim 14, wherein the guide for the rod is made of bottoms of the recesses of the T-slots or dovetail slots.

17. The guardrail according to claim 14, wherein consecutive placed tube sections function as posts in the guardrail and that the at least one fourth connector in form of the rod is protruding from the lower opening of the lowermost of the tube section of the post and is provided with a foot for supporting the guardrail upon a floor.

18. The guardrail according to claim 14, wherein the rod is anchored in both of the two consecutive placed tube sections by pins or shanks of screws extending through flushing openings in the bottom of the recesses of the slot and in the wall of the guide, respectively.

19. The guardrail according to claim 14, wherein the rod is a tube.

20. A guardrail for protecting persons being present on open floors of buildings or scaffolds against accidentally falling out of the opening of such floors, comprising a plurality of constructional elements and connectors for assembling the constructional elements to a coherent guardrail, wherein the connectors comprise a pair of first and second connectors, with each first connector having a longitudinal shape and being formed with at least one longitudinal extending slot, and each second connector including a first connector part to be connected to at least one constructional element and a second connector part to connect the first connector part to a first connector while engaging the at least one longitudinal extending slot of the first connector; wherein the at least one constructional element includes a frame adapted to change its height and width in such way that the guardrail extends all the way between two succeeding open floors of the building, and a panel is releasably mounted in the frame in such way that the frame is allowed to change the height and width in order to form a temporary guardrail.

* * * * *